Feb. 3, 1959 R. L. KONKLE 2,872,252
SERVICING STAND
Filed Feb. 7, 1957 2 Sheets-Sheet 1
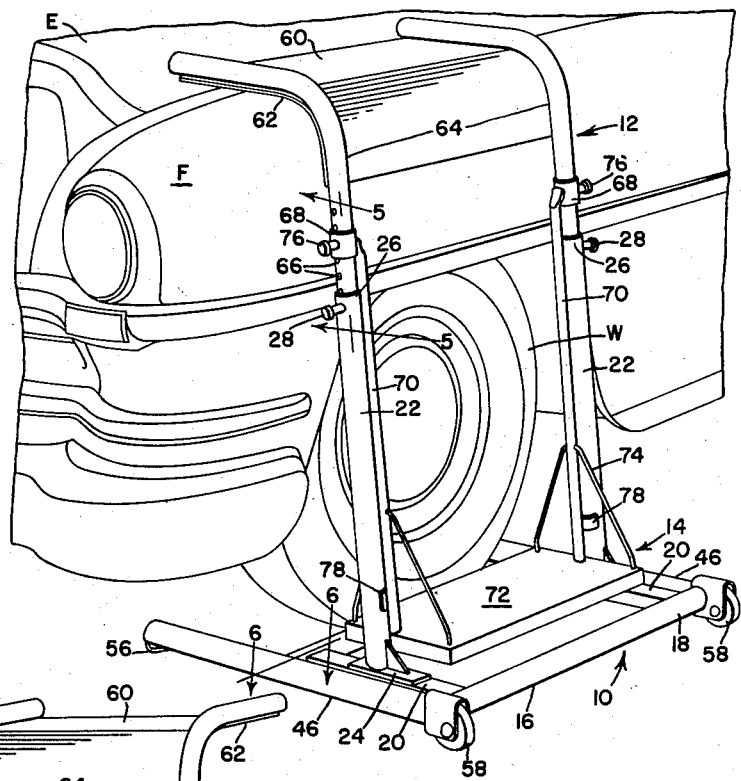
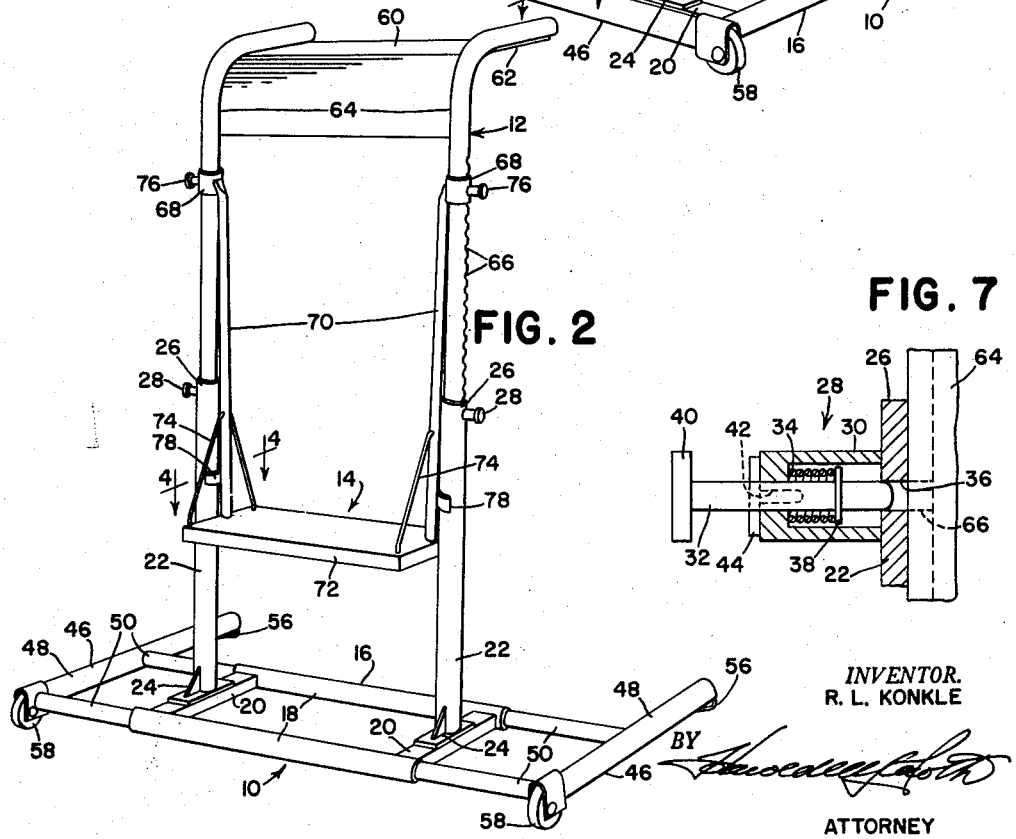
INVENTOR.
R. L. KONKLE
ATTORNEY Feb. 3, 1959    R. L. KONKLE    2,872,252
SERVICING STAND
Filed Feb. 7, 1957    2 Sheets-Sheet 2
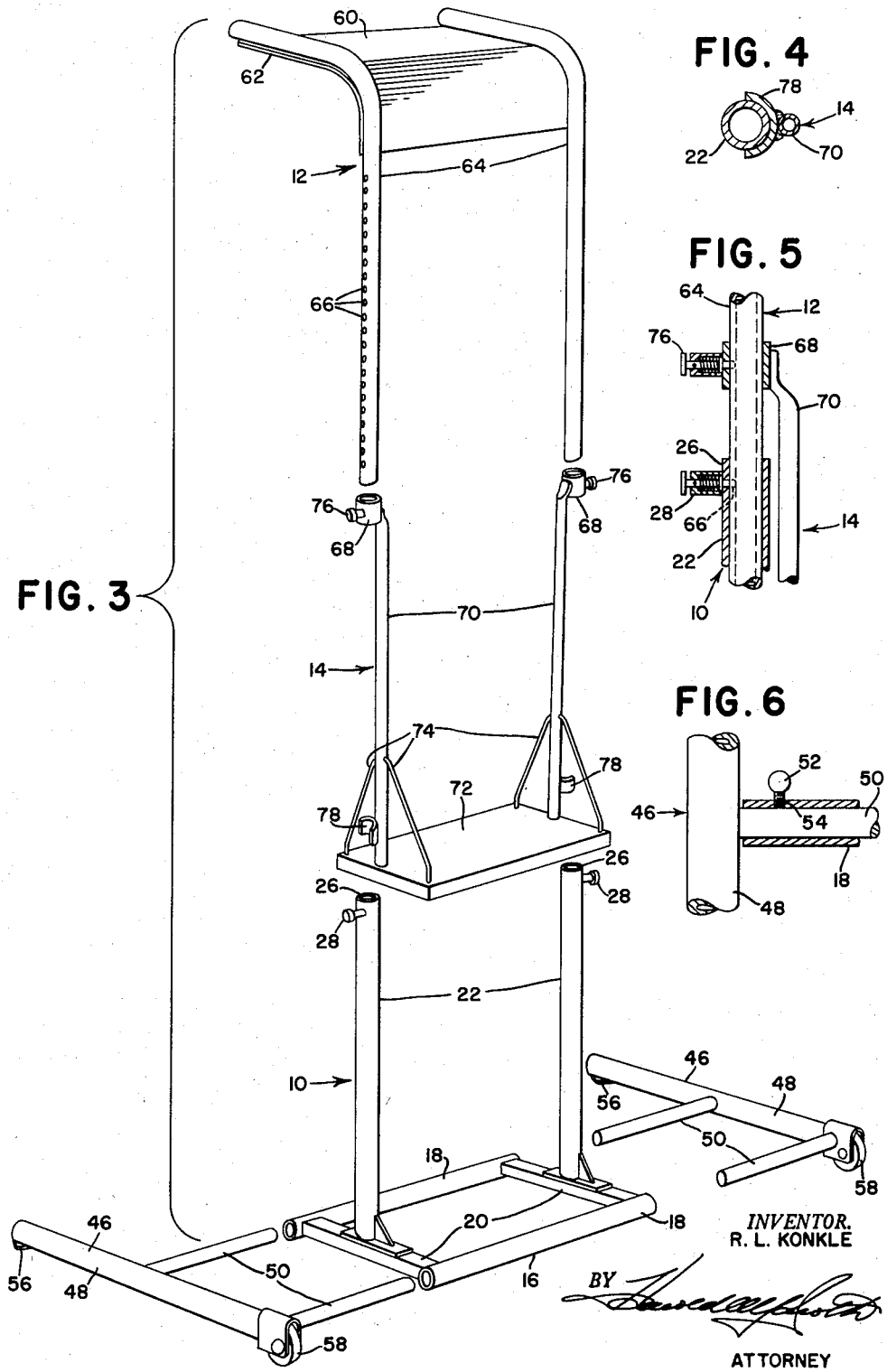
INVENTOR.
R. L. KONKLE
BY
ATTORNEY

United States Patent Office 2,872,252
Patented Feb. 3, 1959

2,872,252

SERVICING STAND

Raymond L. Konkle, Clinton, Iowa

Application February 7, 1957, Serial No. 638,768

9 Claims. (Cl. 304—2)

This invention relates to a stand structure or servicing device particularly adapted to facilitate the performance of repair and maintenance work in the engine compartments of passenger cars, motor trucks and like vehicles wherein the modern trend to wider and higher fenders has made it increasingly difficult for the mechanic to reach the engine and associated parts unless he stands in some suitable position spaced above the floor. At the same time, a person leaning over a fender to gain access to the engine compartment is apt to damage the finish of the fender because of buttons, buckles etc. on his garb.

Although it is known to provide a stand, support or scaffolding for the purpose intended, prior structures leave much to be desired along the lines of adjustability in height and width, adaptability to different types of vehicles, and initial low cost and ease of maintenance. Hence, it is a principal object of this invention to afford a servicing stand of the class described but which embodies a vertically adjustable step structure. The invention features in this respect a three-unit structure in which an upper vehicle-fender-accommodating and protecting element is vertically adjustable relative to a base and the step structure is carried by the upper element for adjustment optionally with or relative to said element, thus accommodating users of different statures. A further object resides in transverse extension means on the base, preferably at each side of the base and adjustable as to width not only for increasing base stability but also enabling off-center locations for the upper element relative to floor-engaging base portions that straddle the vehicle front wheel. Still further objects exist in means suspending the step structure from the upper element, means guiding the step structure on the base; construction of the guide means so as to permit ready assembly and disassembly of the structure, and such other objects and features as will appear in or suggest themselves from the ensuing description of a preferred embodiment of the invention as illustrated in the accompanying drawings, the several figures of which are described below:

Figure 1 is a perspective showing the stand as used adjacent the front portion of a passenger car.

Figure 2 is a perspective of the stand alone, as seen from another vantage point and illustrating an adjusted higher position thereof.

Figure 3 is an "exploded" perspective of the stand.

Figure 4 is an enlarged section on the line 4—4 of Figure 2.

Figure 5 is an enlarged section on the line 5—5 of Figure 1.

Figure 6 is an enlarged section on the line 6—6 of Figure 1.

Figure 7 is an enlarged fragmentary section showing one of the locking devices in retracted position.

The servicing stand is used typically, as shown in Figure 1, for facilitating access to the engine compartment E of a motor car of which the left front fender and wheel are visible at F and W. Because of the adjustability of the stand, as will be brought out below, it is adapted for use with motor trucks, which have higher fenders, and with other vehicles and in other situations as well.

The stand is best considered as having three units: a base 10, an upper element 12 and step structure 14. These are shown in separated relation in Figure 3.

The base includes lower or bottom means in the form of a generally rectangular, normally substantially horizontal frame 16 made up of a pair of transverse hollow members or tubes 18 and rigid cross members 20. Here, as elsewhere in the description, rigid affixation as between various members is preferably achieved by welding or by cap screws in certain instances, but since these details do not limit or expand the invention, elaboration of securing means will be avoided.

A pair of spaced apart hollow or tubular members 22 rise from the base frame 16 and afford a pair of uprights for telescopically receiving the upper element 12, as will be further described. Each upright tube has a lower flange 24 rigid thereon and rigidly affixed to and adequately braced on the proximate cross member or bar 20 of the frame 16. These tubes have coterminous upper ends 26, each of which carries a lock means or device 28 of the type best shown in Figure 7; although, any suitable equivalent means will suffice. As shown in that figure, each lock includes a cylindrical housing 30 welded to the proximate upright end 26 and projecting horizontally outwardly therefrom to slidably carry a spring-loaded latch 32, normally biased axially inwardly by a spring 34 to project through a registering opening 36 in the tube. The spring acts against a collar 38 fixed to the latch and the latch has an outer head 40 by means of which it can be manually retracted outwardly. The housing 30 is diametrically slotted at 42 and the latch has a diametrical pin 44 which is received by the slots when the latch is in locking position. When the latch is pulled out and turned, the pin 44 engages the end of the housing (Figure 7) and holds the latch in its retracted position.

The base frame 16 is provided with a pair of independently transversely adjustable floor- or ground-engaging extensions 46, each comprising an elongated end member 48 and a pair of parallel bars 50 secured rigidly to and extending inwardly and normally from the end member in spaced apart relation on the order of and so as to be horizontally telescopically receivable by the tubular members 18 of the base frame 16. Each end of one member 18 carries a releasable lock device, here a wing screw 52 threaded into a tapped bore 54 in the wall of the member and engageable with and disengageable from the associated extension bar 50 (Figure 6). Experience has shown that similar devices are not required on the other cross tube 18, but such could be used if desired.

Each end member 48 of each extension frame has a foot 56 at one end and a roller or wheel 58 at its other. The wheels are coaxial on an axis parallel to the frame members 18 and enable the stand to be tilted and moved. When the feet 56 engage the floor, the stand is relatively stationary.

When the stand is in use, the feet ends of the members 48 may straddle the vehicle wheel (W in Figure 1) and the uprights 22 will be substantially centered on that wheel. However, either base extension 46 may be extended independently of the other to enable shifting of the stand fore and aft of the vehicle.

The upper element 12 has a top portion in the form of a plate 60 of inverted L shape adapted to accommodate the fender F and backed up by a rubber or similar sheet 62 as a protective measure. The plate extends transversely between a pair of depending members 64, here tubular and spaced apart on the order of and to be telescopically receivable or vertically slidable in the upright means afforded by the tubular base uprights 22. Each member 64 is of inverted L shape to conform to the plate 60, and the upright portion thereof has a series of vertically spaced apertures 66 therein in the outer wall thereof and selectively cooperative with the latch 32 of the lock device 28 on the receiving upright 22. When both latches are retracted, the upper element 12 as a unit may be adjusted vertically relative to the base to achieve the proper height of the plate or sheet 60 relative to a particular vehicle fender.

The step structure 14 is suspended from the upper element 12 via mounting means comprising a pair of mounting sleeves or collars 68 respectively vertically slidably received by the depending upper element members 64. Hanger means, here a pair of depending tubular members 70, have their upper ends welded or otherwise secured to inner portions of the sleeves 68 and have coterminous lower ends welded to a horizontal step or platform 72. Braces 74 adequately rigidify the step to the hangers. Each sleeve has at its outer side a lock means or device 76 which may be identical to that at 28 (Figures 5 and 7) and these locks when released enable the step structure to be vertically adjusted relative to the upper element 12 and of course relative to the base 10, when the locks 28 are latched and the locks 76 are released. When the locks 76 are latched and those at 28 released, the step is adjustable in unison with the element 12 relative to the base.

It is a feature of this design that the step structure, in addition to being suspended from the upper element, is guided for vertical movement on the base uprights 22 by guide means here comprising a pair of C-shaped guides or half-rings 78 welded respectively to the hangers 70 (Figure 4). These guides are not only vertically slidable along the uprights 22 but they engage their associated uprights sufficiently to stabilize the step structure against swinging out of line, which is significant because when a mechanic stands on the step 72 and leans over the engine compartment E, considerable rearward force (relative to the mechanic) is exerted against the step. It is also in this respect that the feet 56 on the base have significance, since their frictional contact with the floor or ground prevents the stand from rolling.

The stand is sturdily and economically constructed and is extremely versatile, particularly because of the duality of adjustment of the step with or relative to the upper element and further because of the adjustability of the wing extensions. Adjustment of the step relative to the top plate 60 accommodates mechanics of different statures and once that adjustment has been secured, the top element and step may be adjusted as a unit relative to the base to secure proper height relative to a vehicle fender. The base extensions improve the position-ability of the stand relative to a wheel as at W. In other words, the stand is not limited to positions centered on or at either side of the wheel but has a range of intermediate positions. Of course the stand may be used also at other parts of the vehicle away from the wheels of the vehicle, and the structure is strong enough to sustain a person on the top plate 60.

Advantages and features other than those enumerated will of course suggest themselves to those versed in the art, as will modifications and alterations in the inventive embodiment disclosed, all of which may be achieved without departure from the spirit and scope of the invention.

What is claimed is:

1. A servicing stand of the class described, comprising: a base having bottom means adapted to rest on the floor or ground and a pair of spaced apart hollow uprights rigidly secured to said bottom means and rising to coterminous upper ends; an upper element having a top portion and a pair of elongated depending members rigidly secured to said top portion and spaced apart on the order of and respectively vertically telescopically received in the uprights to enable vertical adjustment of the upper element relative to the base; first lock means cooperative between the base and upper element for releasably fixing selected adjusted positions of said element; step structure disposed in depending relation to the upper element and laterally intermediate the uprights, said structure having a pair of mounting means respectively vertically slidably engaging the upper element members above the upper ends of the uprights. hanger means secured to and depending from the mounting means and a step carried by the hanger means; and second lock means cooperative between the step structure and the upper element for releasably locking said structure to said element whereby said structure is optionally adjustable relative to both said element and the base or with the element relative to the base.

2. The invention defined in claim 1, in which: the step structure includes a pair of guide means in addition to the second lock means and respectively vertically slidably engaging the uprights.

3. The invention defined in claim 2, in which: the first lock means includes a pair of lock devices respectively on the uprights and respectively engageable with and disengageable from the upper element members; and the guide means are so constructed as to freely vertically pass the lock devices to enable upward separation of the upper element and step structure from the base.

4. A servicing stand of the class described, comprising: a base having bottom means adapted to rest on the floor or ground and a pair of spaced apart uprights rigidly secured to said bottom means and rising to coterminous upper ends; an upper element having a top portion and a pair of elongated depending members rigidly secured to said top portion and spaced apart on the order of and respectively vertically slidably engaging the uprights to enable vertical adjustment of the upper element relative to the base; first lock means cooperative between the base and upper element for releasably fixing selected adjusted positions of said element; step structure disposed in depending relation to the upper element and having mounting means vertically slidably engaging the upper element members, hanger means secured to and depending from the mounting means and a step carried by the hanger means; and second lock means cooperative between the step structure and the upper element for releasably locking said structure to said element whereby said structure is optionally adjustable relative to both said element and the base or with the element relative to the base.

5. A servicing stand of the class described, comprising: a base having bottom means adapted to rest on the floor or ground and a pair of spaced apart uprights rigidly secured to said bottom means and rising to coterminous upper ends; an upper element having a top portion and a pair of elongated depending members rigidly secured to said top portion and spaced apart on the order of and respectively vertically slidably engaging the uprights to enable vertical adjustment of the upper element relative to the base; first lock means cooperative between the base and upper element for releasably fixing selected adjusted positions of said element; and step structure secured to and depending from the upper element.

6. A servicing stand of the class described, comprising: a base having bottom means adapted to rest on the floor or ground and a pair of spaced apart uprights rigidly secured to said bottom means and rising to coterminous upper ends; an upper element having a top portion and a pair of elongated depending members rigidly secured to said top portion and spaced apart on the order of and respectively supported by the uprights; step structure disposed in depending relation to the upper element and having mounting means vertically slidably engaging the upper element members, hanger means secured to and depending from the mounting means and a step carried by the hanger means; and lock means cooperative between the step structure and the upper element for releasably locking said structure to said element.

7. A servicing stand of the class described, comprising: a base having bottom means adapted to rest on the floor or ground and upright means rigidly secured to said bottom means; an upper element having a top portion and depending means rigidly secured to said top portion and vertically slidably engaging the upright means to enable vertical adjustment of the upper element relative to the base; first lock means cooperative between the base and upper element for releasably fixing selected adjusted positions of said element; step structure disposed in depending relation to the upper element and having mounting means vertically slidably engaging the upper element depending means, hanger means secured to and depending from the mounting means and a step carried by the hanger means; and second lock means cooperative between the step structure and the upper element for releasably locking said structure to said element whereby said structure is optionally adjustable relative to both said element and the base or with the element relative to the base.

8. A servicing stand of the class described, comprising: a base having bottom means adapted to rest on the floor or ground and upright means rigidly secured to said bottom means; an upper element having a top portion and depending means rigidly secured to said top portion and vertically slidably engaging the upright means to enable vertical adjustment of the upper element relative to the base; lock means cooperative between the base and upper element for releasably fixing selected adjusted positions of said element; and step structure secured to and depending from the upper element.

9. A servicing stand of the class described, comprising: a base having bottom means adapted to rest on the floor or ground and upright means rigidly secured to said bottom means; an upper element having a top portion and depending means rigidly secured to said top portion and supported by the upright means; step structure disposed in depending relation to the upper element and having mounting means vertically slidably engaging the upper element depending means, hanger means secured to and depending from the mounting means and a step carried by the hanger means; and lock means cooperative between the step structure and the upper element for releasably locking said structure to said element.

References Cited in the file of this patent

UNITED STATES PATENTS

| | | |
|---|---|---|
| 2,378,678 | Anderson | June 19, 1945 |
| 2,575,503 | Warren | Nov. 20, 1951 |
| 2,772,063 | Remstein | Nov. 27, 1956 |